United States Patent
Kaiser (10) Patent No.: US 9,343,906 B2
(45) Date of Patent: May 17, 2016

(54) HIGH DYNAMIC DC-VOLTAGE CONTROLLER FOR PHOTOVOLTAIC INVERTER

(75) Inventor: Karl Kaiser, Wiener Neustadt (AT)

(73) Assignee: Schneider Electric Solar Inverters USA, Inc., Livermore, CA (US)

(*) Notice: Subject to any disclaimer, the term of this patent is extended or adjusted under 35 U.S.C. 154(b) by 219 days.

(21) Appl. No.: 13/159,396

(22) Filed: Jun. 13, 2011

(65) Prior Publication Data

US 2012/0310438 A1 Dec. 6, 2012

Related U.S. Application Data

(60) Provisional application No. 61/493,045, filed on Jun. 3, 2011.

(51) Int. Cl.
G06F 1/26 (2006.01)
H02J 3/38 (2006.01)

(52) U.S. Cl.
CPC ............. *H02J 3/383* (2013.01); *H02J 3/385* (2013.01); *Y02E 10/563* (2013.01); *Y02E 10/58* (2013.01)

(58) Field of Classification Search
CPC ................................................. H02M 7/537
USPC ................... 700/298, 287; 363/49, 95, 79, 71
See application file for complete search history.

(56) References Cited

U.S. PATENT DOCUMENTS

| | | | |
|---|---|---|---|
| 6,128,204 A | 10/2000 | Munro et al. | |
| 7,768,155 B2 | 8/2010 | Fornage | |
| 2008/0013347 A1 | 1/2008 | Deng et al. | |
| 2008/0150366 A1 | 6/2008 | Adest et al. | |
| 2009/0167097 A1 | 7/2009 | Seymour et al. | |
| 2010/0188869 A1* | 7/2010 | Fredette et al. | 363/15 |
| 2011/0032734 A1 | 2/2011 | Melanson | |

(Continued)

FOREIGN PATENT DOCUMENTS

CN 101436833 A 5/2009
CN 101765965 A 6/2010

(Continued)

OTHER PUBLICATIONS

International Preliminary Report on Patentability for International Application No. PCT/US2012/039595, dated Dec. 19, 2013, 8 pgs.

(Continued)

*Primary Examiner* — Mohammad Ali
*Assistant Examiner* — Emilio J Saavedra
(74) *Attorney, Agent, or Firm* — Hunter Clark PLLC (57) ABSTRACT

A method for initializing a power inverter of a photovoltaic system includes: opening an AC mains switch and a DC switch to disconnect the power inverter from an electrical grid and to disconnect a capacitor bank associated with the inverter from a solar cell array; closing the AC mains switch to allow power to flow from an electrical grid to the DC capacitor bank to charge the DC capacitor bank; monitoring the DC capacitor bank until a desired voltage is reached; initiating the operation of the power inverter; stabilizing the DC voltage received from the DC capacitor bank at a predetermined power up voltage for the power inverter; waiting for an inverter initialization period to elapse; and adjusting DC voltage received by the power inverter to a voltage associated with a maximum power output level of the solar cell array.

19 Claims, 7 Drawing Sheets

(56) References Cited

U.S. PATENT DOCUMENTS

| | | | |
|---|---|---|---|
| 2012/0051101 A1* | 3/2012 | El-Barbari et al. | 363/49 |
| 2012/0126626 A1 | 5/2012 | Falk et al. | |
| 2012/0228951 A1* | 9/2012 | Lehmann | 307/85 |

FOREIGN PATENT DOCUMENTS

| | | | |
|---|---|---|---|
| EP | 2061143 A1 | | 5/2009 |
| EP | 2282388 A1 | | 2/2011 |
| EP | 2325984 A1 | | 5/2011 |
| JP | 07072942 A | | 3/1995 |
| WO | WO 2011064232 A2 | * | 6/2011 |

OTHER PUBLICATIONS

International Search Report & Written Opinion of the International Search Authority (KR) dated Nov. 16, 2012, for International Application No. PCT/US2012/039595, 11 pgs.

Extended European Search Report dated Nov. 4, 2014 for European Application No. EP12792382.9, 5 pgs.

State Intellectual Property Office of the P.R.C. (SIPO) 1st Office Action and Search Report for Application No. 2012800384852 dated Jul. 15, 2015, 14 pgs., (no English language translation currently available).

* cited by examiner

HIGH DYNAMIC DC-VOLTAGE CONTROLLER FOR PHOTOVOLTAIC INVERTER

CROSS-REFERENCES TO RELATED APPLICATIONS

This application claims the benefit of U.S. Provisional Application No. 61/493,045, filed Jun. 3, 2011, entitled "High Dynamic DC-Voltage Controller for Photovoltaic Inverter."

BACKGROUND

Photovoltaic systems use solar cells to convert light into electricity. A typical photovoltaic system includes a plurality of components, including photovoltaic cells, mechanical and electrical connections, mountings, and controllers for regulating and/or modifying the electrical current produced by the photovoltaic system.

Figure 1:
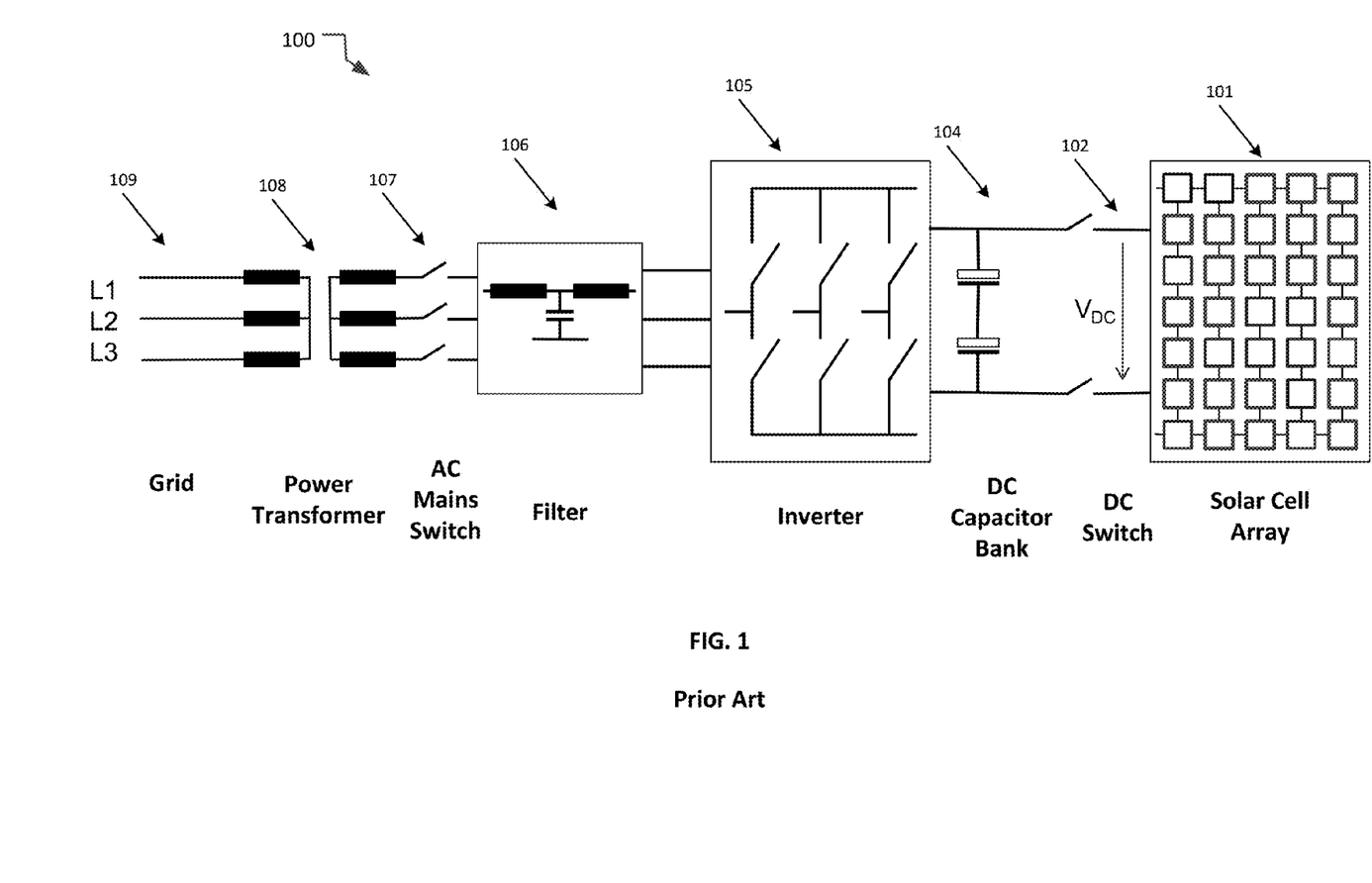
FIG. 1 is a high level block diagram of a conventional photovoltaic system.

The following terms are used herein to describe various components and/or operational aspects of photovoltaic systems:
PV photovoltaic
DC direct current
AC alternate current
$I_{SC}$ short circuit current
$V_{OC}$ open circuit voltage
$P_{max}$ maximum output power of the solar array
$V_{max}$ output voltage of the solar array at maximum output power
$I_{max}$ output current of the solar array at maximum output power FIG. 1 is a block diagram of a conventional photovoltaic power system 100. The PV power system 100 includes a solar cell array 101 that comprises a plurality of solar cells (also referred to as photovoltaic cells) that convert light into DC voltage. The solar cells are solid state devices that convert the energy of sunlight directly into electricity by the photovoltaic effect. The solar cell array 101 is coupled to a DC switch 102. The DC switch 102 can be closed to connect the solar cell array 101 to DC capacitor bank 104, or can be opened to disconnect the solar cell array 101 from the DC capacitor bank 104. When the DC switch 102 is closed and the solar cell array 101 is generating power, the solar cell array 101 can provide power to charge the DC capacitor bank 104.

The DC capacitor bank 104 is connected to inverter 105. The inverter 105 converts the DC voltage output from the capacitor bank 104 into 3-phase (or in some cases 2-phase) pulsed AC voltage. The filter 106 converts the pulsed AC voltage output by the inverter 105 into a sinusoidal AC voltage. The sinusoidal AC voltage can then be output to a mains power grid 109. If an AC mains switch 107 is closed, the sinusoidal AC voltage output by the filter 106 is received by the power transformer 108. The power transformer 108 adapts the voltage output by the PV system 100 to the grid voltage. This configuration allows the PV system 100 to output electricity onto the mains grid 109. The voltage output by the photovoltaic system 100 has to be higher than the grid voltage. Inverter 105 may have a mandatory ramp up period where the DC voltage provided by the solar cell array 101 must be gradually ramped up from an initial startup voltage to an operating voltage.

Figure 2:
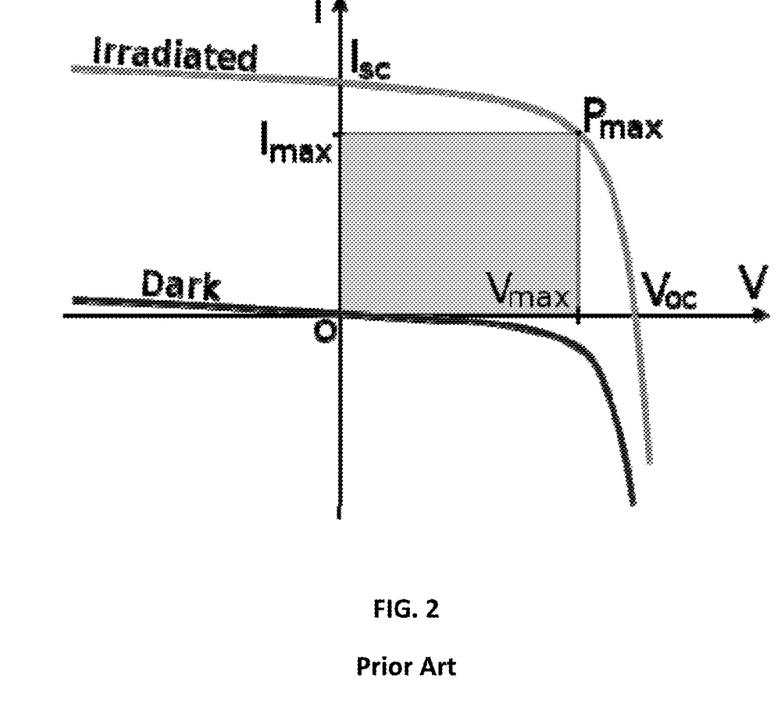
FIG. 2 is an I-V curve for a solar cell that illustrates the maximum power point for the solar cell.

FIG. 2 is a graph illustrating the characteristics of a photovoltaic cell. The graph is a current-voltage (I-V curve) for a typical PV cell. $V_{OC}$ represents the output voltage of the solar cell or array of solar cells where no load is connected to the PV cell or array of cells. In the example illustrated in FIG. 1, when the DC switch 102 is open, $V_{OC}$ represents the output voltage of the solar cell array 101, because the solar cell array 101 is disconnected from the load (the grid 109).

The value $I_{SC}$ represents the current produced by the PV cell or array of cells in the event that there is a short circuit. As can be seen from the graph in FIG. 2, there is a maximum voltage $V_{max}$ where the PV cell or array of cells produces maximum power $P_{max}$. In a typical photovoltaic system, such as PV power system 100, the inverter 105 includes a DC voltage controller (not shown) that controls the DC voltage ($V_{DC}$) provided by the PV cell or array of cells to operates the PV cell or array of cells at the maximum power point. The grid voltage and the $V_{max}$ of the PV cell or array of cells typically do not change very quickly, so the DC-voltage controller typically does not have to dynamically respond to rapid changes in these voltages.

The following is a typical process for powering up of a photovoltaic system, such a PV system 100. If the $V_{DC}$ of the solar array is higher than a predetermined threshold voltage (at least higher than the peak transformer output AC-voltage), the PV system controller closes the DC switch 102 between the DC capacitor bank 104 and the solar cell array 101. Once the DC switch 102 has been closed, the solar array 101 is operating as a current source and begins to charge the DC capacitor bank 104 according to the specific photovoltaic cell characteristics of the solar array and the DC voltage level being generated. Once the DC capacitor bank 104 has been charged to $V_{OC}$, the inverter 105 closes the AC mains switch 107. The peak of the transformer output AC voltage is lower than $V_{OC}$. At this point, no current is flowing between the solar array and the grid, even though all the switches are closed. Next, the inverter 105 starts to generate AC voltage and the inverter 105 synchronizes its AC output voltage to grid voltage and grid frequency. AC output current of the inverter 105 during this phase of operation is approximately zero. The photovoltaic system is not yet generating power, and the DC voltage is $V_{OC}$. Once the inverter 105 has begun generating AC voltage and has synchronized its output voltage with the grid voltage, the DC voltage controller of the photovoltaic system begins operation and reduces the DC voltage from $V_{OC}$ to $V_{max}$. Change of the DC voltage is generally a very slow procedure. FIG. 2 illustrates the difference between $V_{OC}$ and $V_{max}$. When the DC voltage is at $V_{OC}$, the system is not generating power, and when the DC voltage is a $V_{max}$, the system is generating maximum power.

The standard power up process described above has several disadvantages. For example, $V_{DC}$ is one of the key design parameters for photovoltaic systems, especially with respect to the components of the inverter 105 and the DC capacitor bank 104. The current trend for photovoltaic systems is that the $V_{DC}$ has been increased to higher values (e.g., in the range of 1000V). A lower $V_{DC}$ would be preferred from a design standpoint, because the inverter would not have to handle such high voltages. In order to operate at higher voltages, efficiency is compromised. The maximum DC voltage during operation of the inverter is $V_{max}$, and the voltage level between $V_{max}$ and $V_{OC}$ is used only during the power up procedure.

Figure 3:
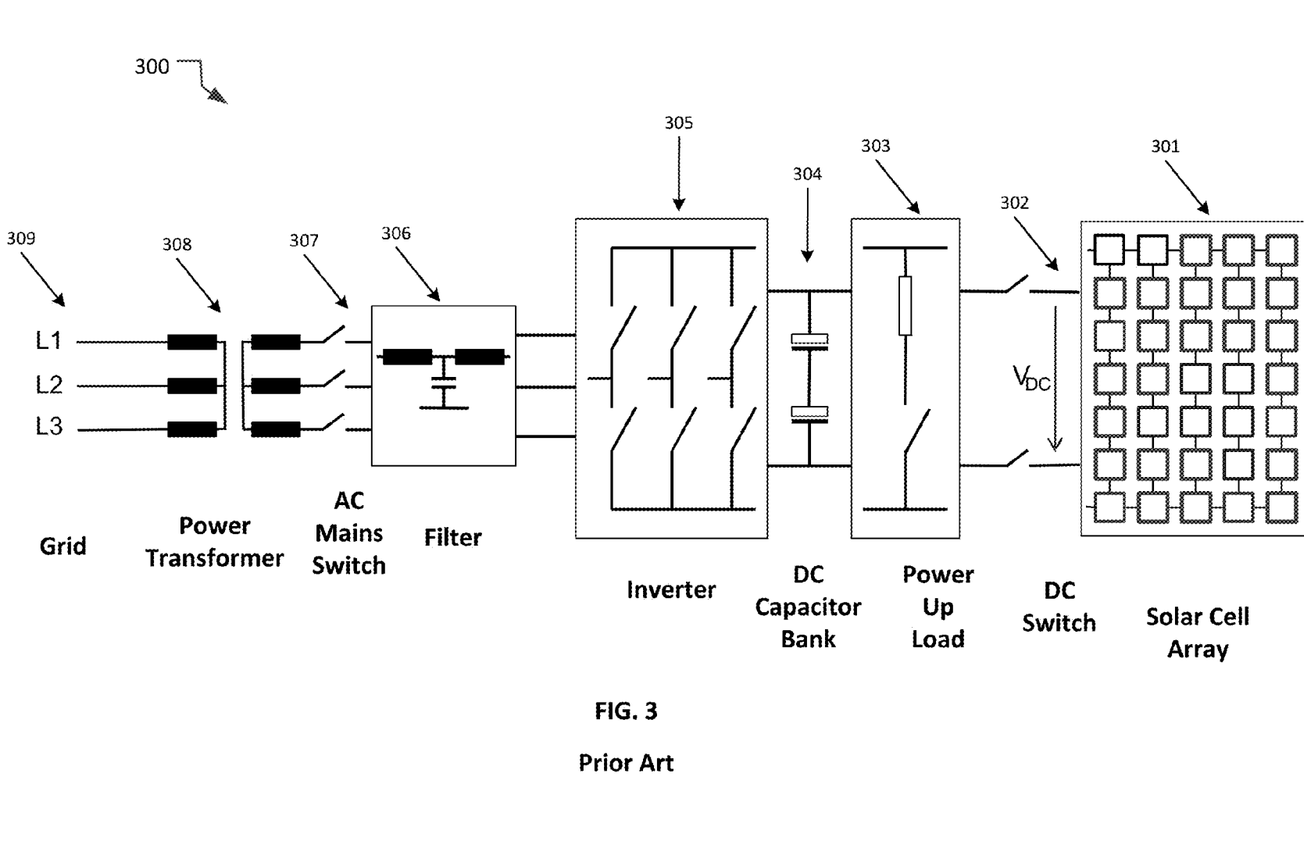
FIG. 3 is a high level block diagram of another conventional PV system that includes a preload.

One technique that can be used to lower the DC voltage provided by the solar cell array 101 is to introduce a preload into the PV system to lower the voltage provided to the inverter 105 during the ramp up period for the inverter 105. FIG. 3 illustrates a PV system 300 that includes a power up preload 303 (also referred to herein as a power up load). The PV system 300 includes a solar cell array 301, a DC switch 302, a DC capacitor bank 304, an inverter 305, a filter 306, an AC mains switch 307, and a power transformer 308. The power transformer 308 adapts the voltage output by the PV system 300 to the grid voltage. This configuration allows the PV system 300 to output electricity onto the mains grid 309.

The power up sequence for the PV system 300 is slightly different than that of the PV system 100, because PV system 300 includes the preload 303. In PV system 300, the PV system controller closes the DC switch 302 which connects the solar cell array 301 to the power up load 303. The power up load 303 is disposed between the solar cell array 301 and the DC capacitor bank 304. The controller of the PV-inverter 305 then closes the AC mains switch 307 until the DC capacitor bank 304 is charged to $V_{power\ up}$. The inverter 305 can then start generating AC voltage and the filter 306 begins synchronizing the AC output voltage and to the grid voltage and grid frequency. The power up load 303 is then disabled by the controller of the PV inverter 305, and the DC voltage controller of the PV system 300 being operating to reduce the DC voltage from $V_{power\ up}$ to $V_{max}$ in order to generate maximum power for the PV system.

Figure 4:
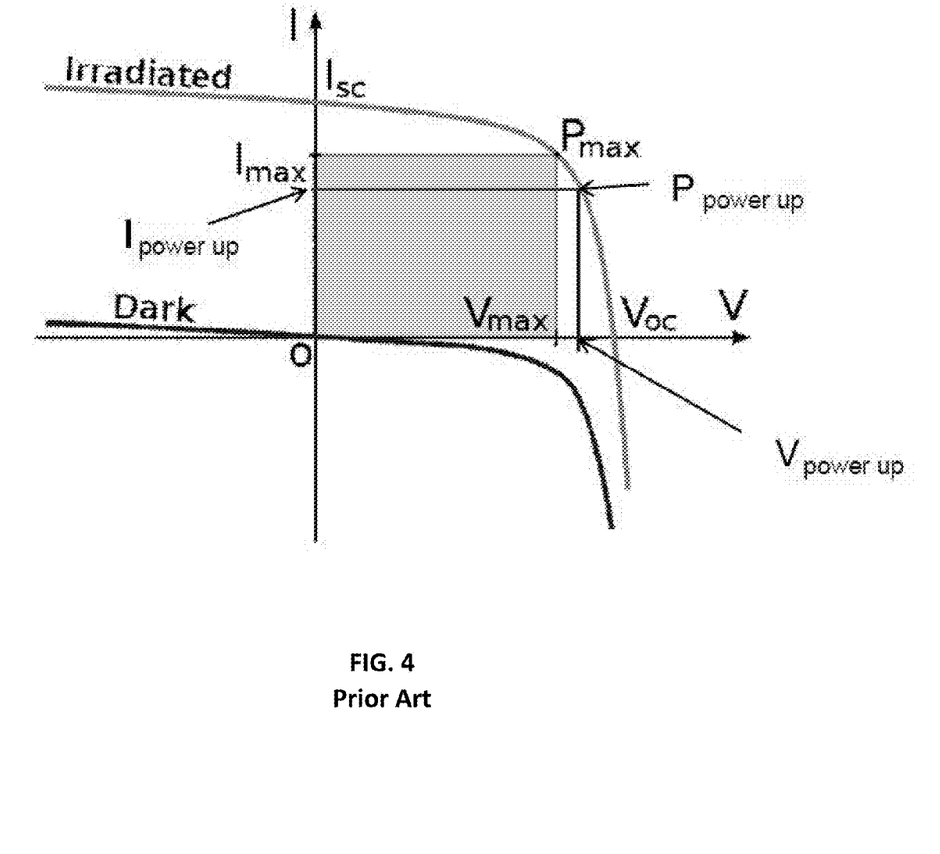
FIG. 4 is an I-V curve for a solar cell that illustrates the characteristics of a photovoltaic cell and a power up loading operating point.

FIG. 4 illustrates the distinction between operating at $V_{power\ up}$ where the power generated by the system equals $P_{power\ up}$ and operating at $V_{max}$ where the power generated by the system equals $P_{max}$. FIG. 4 is a graph illustrating the characteristics of a photovoltaic cell that includes the power up operating point. The graph is a current-voltage (I-V curve) for a typical PV cell. $V_{power\ up}$ represents the power up voltage and $I_{power\ up}$ represent the power up current. As can be seen in FIG. 4, the power up voltage falls between the $V_{max}$ and the $V_{OC}$ for the PV cell or array of cells.

In conventional PV systems, such as those illustrated in FIGS. 1 and 3, the inverter may be "overdesigned" to allow the inverter to operate at higher voltages such as the $V_{OC}$ of the solar cell array, but this approach this sacrifices efficiency of the inverter. Furthermore, adding a preload to the system as suggested in the alternative implementation illustrated in FIG. 3 can decrease the voltage levels at which the inverter can operate, but this approach adds expense and complexity to the PV system.

SUMMARY

Techniques are described for powering up an inverter of a photovoltaic system where the inverter includes a high dynamic DC voltage controller. These techniques can allow the inverter of the PV system to operate more efficiently and to avoid the need to include additional equipment, such as a power up load, in the PV system.

An example method for initializing a power inverter of a photovoltaic system comprising a solar cell array includes: opening an alternating current (AC) mains switch and a direct current (DC) switch, wherein opening the AC mains switch disconnects the power inverter from an electrical grid, and wherein opening the DC switch disconnects a DC capacitor bank associated with the power inverter from the solar cell array; closing the AC mains switch to allow power to flow from the electrical grid to the DC capacitor bank connected to the power inverter to charge the DC capacitor bank; monitoring the DC capacitor bank until a desired voltage for the DC capacitor bank is reached; initiating the operation of the power inverter such that the power inverter begins to receive DC voltage from the DC capacitor bank; stabilizing the DC voltage received from the DC capacitor bank at a predetermined power up voltage for the power inverter; waiting for an inverter initialization period to elapse; and adjusting DC voltage received by the power inverter to a voltage associated with a maximum power output level of the solar cell array.

Implementations of such a method may include one or more of the following features. The desired voltage for the DC capacitor bank is a power up voltage for the power inverter. The DC capacitor bank stores an electrical charge and outputs a DC current to the power inverter. The DC voltage received from the DC capacitor bank at a predetermined power up voltage for the power inverter further comprises stabilizing the DC voltage received at the DC capacitor bank at the power up voltage for the power inverter. The voltage associated with a maximum power output level of the solar cell array is less than the power up voltage for the power inverter. After stabilizing the DC voltage received from the DC capacitor bank at a predetermined power up voltage for the power inverter, closing the DC switch to allow the solar cell array to provide DC power to the DC capacitor bank to charge the DC capacitor bank. Upon initiating operation, converts the DC voltage from the received from the DC capacitor bank to AC voltage that can be output onto the electrical grid.

An example controller for a photovoltaic system, the photovoltaic system including a solar cell array, a direct current (DC) capacitor bank, an alternating current (AC) switch, and a DC switch, the controller including: a tangible, non-transitory computer-readable memory, a plurality of modules comprising processor executable code stored in the memory, a processor, and a control interface. The processor is connected to the memory and configured to access the plurality of modules stored in the memory. The control interface configured to send control signals to the AC switch, the DC switch, and the power inverter. The plurality of modules stored in the memory includes: a voltage control module and a control signal module. The voltage control module is configured to cause the processor to perform a method for initializing a power inverter of a photovoltaic system comprising: opening an alternating current (AC) mains switch and a direct current (DC) switch, wherein opening the AC mains switch disconnects the power inverter from an electrical grid, and wherein opening the DC switch disconnects the power inverter from the solar cell array, closing the AC mains switch to allow power to flow from the electrical grid to a DC capacitor bank connected to the power inverter to charge the DC capacitor bank, monitoring the DC capacitor bank until a desired voltage for the DC capacitor bank is reached, initiating the operation of the power inverter such that the power inverter begins to receive DC voltage from the DC capacitor bank, stabilizing the DC voltage received from the DC capacitor bank at a predetermined power up voltage for the power inverter, waiting for inverter initialization period to elapse, and adjusting DC voltage received by power inverter to a maximum voltage associated with a maximum power level of the solar cell array. The control signal module configured to cause the processor to send control signals to the AC switch, the DC switch, and the power inverter.

Implementation of the controller may include one or more of the following features. The desired voltage for the DC capacitor bank is a power up voltage for the power inverter. The DC capacitor bank stores an electrical charge and outputs a DC current to the power inverter. Stabilizing the DC voltage received from the DC capacitor bank at a predetermined power up voltage for the power inverter further comprises stabilizing the DC voltage received at the DC capacitor bank at the power up voltage for the power inverter. The voltage associated with a maximum power output level of the solar cell array is less than the power up voltage for the power inverter. After stabilizing the DC voltage received from the DC capacitor bank at a predetermined power up voltage for the power inverter, closing the DC switch to allow the solar cell array to provide DC power to the DC capacitor bank to charge the DC capacitor bank. The power inverter, upon initiating operation, converts the DC voltage from the received from the DC capacitor bank to AC voltage that can be output onto the electrical grid.

A system for initializing the power inverter of a photovoltaic system that includes a solar cell array includes: means for opening an alternating current (AC) mains switch and a direct current (DC) switch, wherein opening the AC mains switch disconnects the power inverter from an electrical grid, and wherein opening the DC switch disconnects a DC capacitor bank associated with the power inverter from the solar cell array; means for closing the AC mains switch to allow power to flow from the electrical grid to the DC capacitor bank connected to the power inverter to charge the DC capacitor bank; means for monitoring the DC capacitor bank until a desired voltage for the DC capacitor bank is reached; means for initiating the operation of the power inverter such that the power inverter begins to receive DC voltage from the DC capacitor bank; means for stabilizing the DC voltage received from the DC capacitor bank at a predetermined power up voltage for the power inverter; means for waiting for inverter initialization period to elapse; and means for adjusting DC voltage received by power inverter to a voltage associated with a maximum power output level of the solar cell array.

Implementation of the system may include one or more of the following features. The desired voltage for the DC capacitor bank is a power up voltage for the power inverter. The DC capacitor bank stores an electrical charge and outputs a DC current to the power inverter. The means for stabilizing the DC voltage received from the DC capacitor bank at a predetermined power up voltage for the power inverter further comprises means for stabilizing the DC voltage received at the DC capacitor bank at the power up voltage for the power inverter. The voltage associated with a maximum power output level of the solar cell array is less than the power up voltage for the power inverter. Means for closing the DC switch to allow the solar cell array to provide DC power to the DC capacitor bank to charge the DC capacitor bank when the DC voltage received from the DC capacitor bank at a predetermined power up voltage for the power inverter has been stabilized. The power inverter, upon initiating operation, includes means for converting the DC voltage from the received from the DC capacitor bank to AC voltage that can be output onto the electrical grid.

DETAILED DESCRIPTION

Techniques are described for powering up an inverter of a photovoltaic system where the inverter includes a high dynamic DC voltage controller. These techniques can allow the inverter of the PV system to operate more efficiently and to avoid the need to include additional equipment, such as a power up load, in the PV system.

Figure 5:
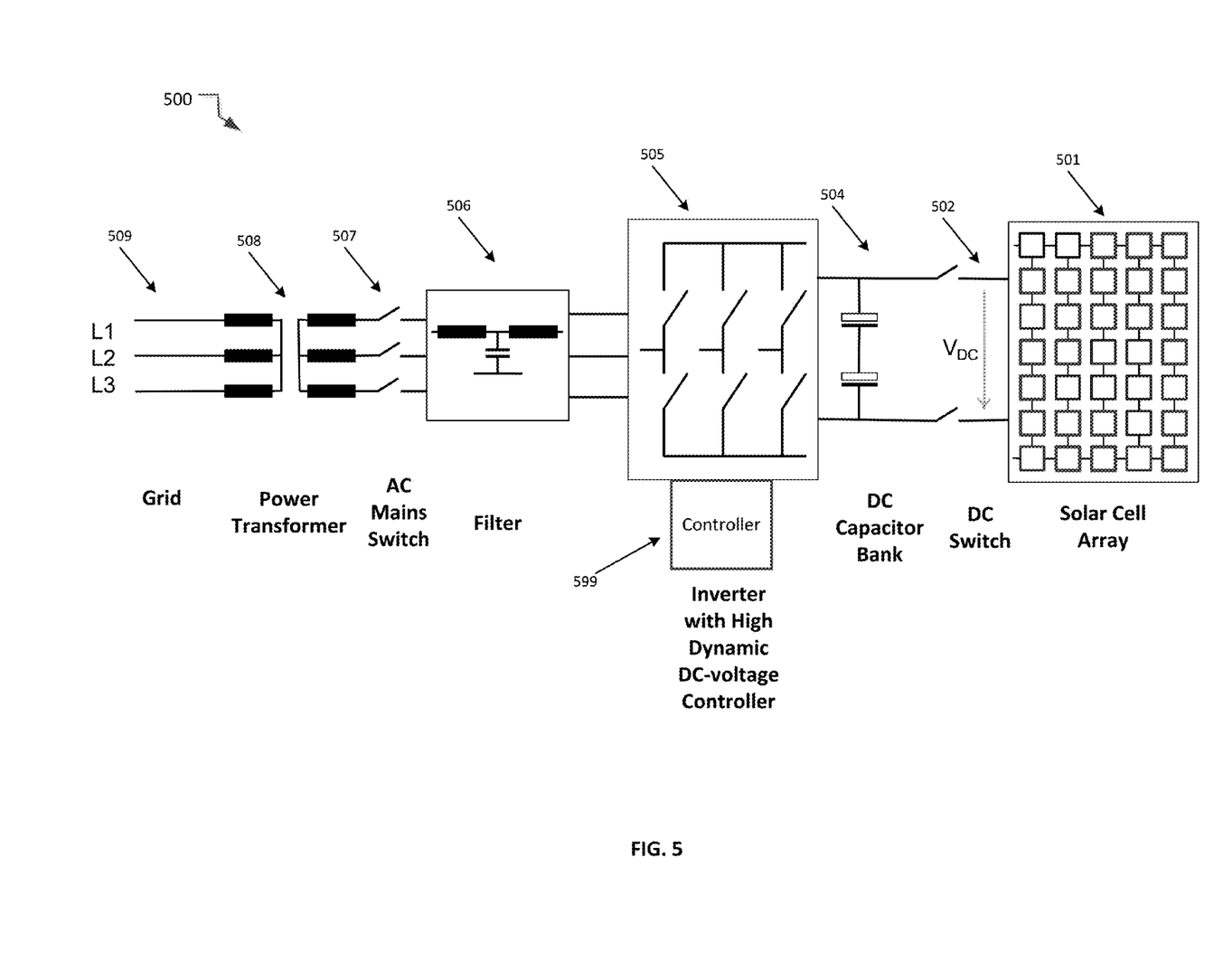
FIG. 5 is a high level block diagram of a PV system that includes a DC controller for the PV inverter of the PV system.

FIG. 5 is a high level block diagram of a PV system 500. The inverter 505 of the PV system includes a high-dynamic DC controller 599 that has a fast current control rise time. The PV system 500 includes solar cell array 501. Solar cell array includes one or more PV cells that generate DC voltage when exposed to light using the photovoltaic effect. The solar cell array 501 is coupled to DC switch 502. The DC switch 502 can be closed to connect the solar cell array 501 to DC capacitor bank 504, or opened to disconnect the solar cell array 501 from the DC capacitor bank 504. The DC controller 599 can be configured to send a control signal to the DC switch 502 to open or close the switch.

Figure 7:
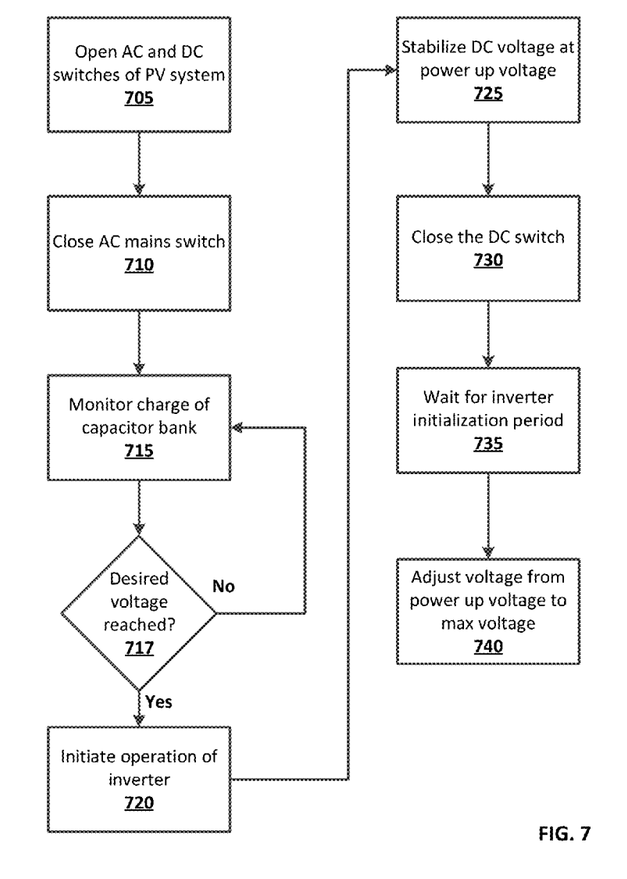
FIG. 7 is a block flow diagram of a method for powering up a photovoltaic system.

The DC controller 599 can control the operation of the DC switch 502. During the power up procedure for the inverter 505, the DC controller 599 does not close the DC switch 502 and disconnect the solar cell array 501 from the DC capacitor bank 504 to prevent the solar cell array 501 from charging the DC capacitor bank 504. Instead, the DC controller 599 can cause the DC capacitor bank 504 to be charged from the grid 509 by closing the AC mains switch 507. A method for implementing a power up procedure for the inverter 505 is illustrated in FIG. 7 where the DC controller 599 charges the DC capacitor bank 504 from the grid 509 rather than from the solar cell array 501. By charging the DC capacitor bank 504 from the grid 509 rather than the solar cell array 504 during the startup period for the inverter 505, the inverter 505 can be designed to operate at lower voltages which can result increased efficiency. This approach also eliminates the need to include an expensive preload to the PV system 500.

The DC capacitor bank 504 is connected to inverter 505. The inverter 505 converts the DC voltage output from the capacitor bank 504 into 3-phase (or in some cases 2-phase) pulsed AC voltage. The inverter 505 outputs pulsed AC current to a filter 506. The filter 506 converts the pulsed AC voltage output by the inverter 505 into a sinusoidal AC voltage. The sinusoidal AC voltage can then be output to a mains power grid 509.

The DC controller 599 can also control the operation of AC mains switch 507. The DC controller 599 can be configured to send a control signal to the AC mains switch 507 to close the AC mains switch 507 to allow the sinusoidal AC voltage output by the filter 506 to be received by the power transformer 508. The power transformer 508 adapts the voltage output by the PV system 500 to the grid voltage. This configuration allows the PV system 500 to output electricity onto the mains grid 509. The DC controller 599 can also send a control signal to close the AC mains switch 507 to initiate a power up phase of the inverter 505. During the power up phase of the inverter 505, the DC controller 599 will not close the DC switch 502, to disconnect the DC capacitor bank 504 from the solar cell array 501 and close the AC mains switch 507 to charge the DC capacitor bank 504 through the filter 506 and inverter 505 from the grid 509. This approach allows the DC controller 599 to charge the capacitor bank 504 from the grid 509. The DC controller 599 can initialize the operation of the inverter 505 once the DC capacitor bank 504 has been charged to $V_{power\_up}$. The DC controller 599 can then stabilize the operating voltage of the inverter 505 at $V_{power\_up}$.

The DC controller 599 can close the DC switch 502 to allow the solar cell array 501 to provide power to the DC capacitor bank 504 to charge the capacitor bank. The solar cell array 501 can then charge the DC capacitor bank as a current source with a constant current of $I_{power\_up}$. The high dynamic DC voltage controller 599 starts immediately with high dynamic to let flow power from the DC capacitor bank 504 over the different parts 505, 506, 507, 508, of the PV system 500 to the grid 509. This approach limits transient overshooting of the DC voltage ($V_\Delta$) to very low levels. As a result, the maximum DC voltage for the operation of the inverter 505 is $V_{power\ up}+V_\Delta$. The inverter 505 will not be required to operate at $V_{OC}$ of the solar cell array 501. Accordingly, even in systems where the solar cell array 501 has a very high $V_{OC}$, the operating voltage of the inverter 505 can be closely controlled and kept close to $V_{power}$ up, which means that the inverter 505 does not need to be overdesigned to handle higher than necessary operating voltages and more efficient inverter components can be used in inverter 505.

Figure 6:
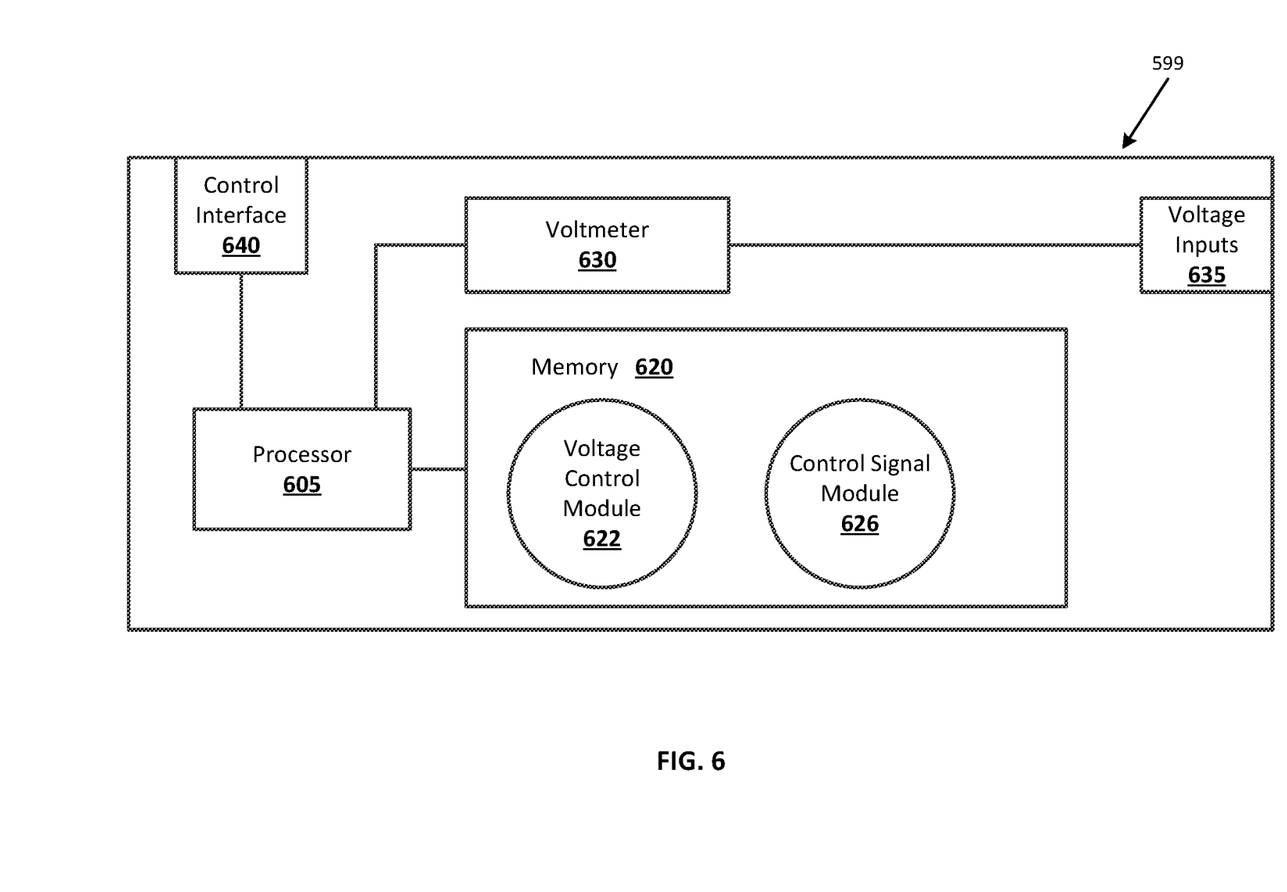
FIG. 6 is a block diagram of a DC controller for a PV inverter.

FIG. 6 is a block diagram of the high dynamic DC 599 for the inverter 505 of PV system 500. Controller 599 includes a processor 605, memory 620, voltage inputs 635, voltmeter 630, and control interface 640. The memory 620 includes a voltage control module 622 and a control signal module 626. The memory 620 can comprise one or more types of tangible, non-transitory computer-readable memory, such as random-access memory (RAM), read-only memory (ROM), flash memory, or a combination thereof. The modules can comprise processor-executable instructions that can be executed by processor 605.

The processor 605 can comprise one or more microprocessors configured to access memory 620. The processor 605 can read data from and write data to memory 620. The processor 605 can also read executable program code from memory 620 and execute the program code.

The voltage inputs 635 provide an interface through which the controller 599 can monitor voltages throughout the photovoltaic system 500. For example, the voltage inputs 635 can be used to monitor the grid voltage ($V_{grid}$), the DC voltage ($V_{DC}$) provided by the solar cell array 501, and/or the voltage of the DC capacitor bank 504. Voltmeter 630 can be used to determine the voltage of the various inputs being monitored using the voltage inputs 635. The voltmeter 630 may be an external voltmeter and the controller 599 can be configured to receive a signal from the external voltmeter that monitors the grid voltage ($V_{grid}$), the DC voltage ($V_{DC}$) provided by the solar cell array 501, and/or the voltage of the DC capacitor bank 504.

The processor 605 can send control signals to one or more external devices via control interface 640. For example, control interface 540 can be connected to AC mains switch 507 and DC capacitor bank 504 and can sent control signals to each of the switches to open and close the switches. The control interface can also sent a control signal to the inverter 504 to initiate a power up sequence of the inverter. The control interface 640 can be configured to provide wired connections, wireless connections, or a combination thereof for controlling the AC mains switch 507 and the DC capacitor bank 504, and for communicating with the inverter 505.

The voltage control module 622 can include executable code that causes the processor 605 to perform a power up method for inverter 505 of a PV system 500. The voltage control module 622 can be configured to perform the steps described in the method of FIG. 7 when the inverter 505 is powered up. The voltage control module 622 can instruct the control signal module 626 to open and close the AC mains switch 507 and the DC switch 502 to control the flow of power through the PV system 500. The voltage control module 622 can also instruct the control signal module 626 to send control signals to the inverter 505. For example, the voltage control module 622 can instruct the control signal module 626 to send a control signal to the inverter 505 to stop operation, to start operation, or to enter into a power up mode.

The control signal module 626 can include executable code that can cause the processor 605 to instruct the control interface 640 to send a command to one or more external devices, such as the AC mains switch 507, the DC capacitor bank 504, and the inverter 505. For example, the control signal module 626 can send a signal to the AC mains switch 507 to close the switch to provide a connection from the grid 509 to the inverter 505 or the control signal module 626 can send a signal to the AC mains switch 507 to open the switch to disconnect the grid 509 from the inverter 505. The control signal module 626 can send a signal to the DC switch 502 to close the switch to provide a connection from the solar cell array 501 to the DC capacitor bank 504 or the control signal module 626 can send a signal to the DC switch 502 to open the switch to disconnect the solar cell array 501 from the DC capacitor bank 504.

FIG. 7 is a block flow diagram of a method for powering up an inverter of a photovoltaic system. The method for powering up a PV system illustrated in FIG. 7 can be implemented by voltage control module 622 of the controller 599 of PV system 500. In the method illustrated in FIG. 7, the DC capacitor bank 504 can be charged with power from the grid and the inverter 505 is operating with his high dynamic DC-voltage controller 599 before the DC switch 502 is closed.

The controller 599 of the inverter 505 can then open the DC switch 502 and the AC switch 507 (step 705). The solar cell array 501 may be generating high DC voltage at this point, but because the DC switch 502 is open, the solar cell array 501 cannot charge the DC capacitor bank 504 up to this high voltage. Also, because the AC mains switch 507 is open, PV system 500 is disconnected from the power grid 509 and is not providing power to or receiving power from the grid 509.

The AC mains switch 507 can then be closed to connect the inverter 505 to the grid 509 (step 710). Power from the grid 509 can now reach the inverter 505 that includes the high dynamic DC voltage controller. The inverter 505 can allow current from the grid to flow into the DC capacitor bank 504 to charge the DC capacitor bank 504. The inverter converts the AC power from grid into DC power that can charge the capacitor bank 504. This approach utilizes power from the grid to charge the capacitor bank 504 rather than relying on DC current provided by the solar cell array 501. The inverter 505 is not operating at this point to convert DC to AC power.

The DC voltage controller can monitor the voltage of the capacitor bank 504 (step 715), and make a determination whether a desired voltage is reached (step 717). If the desired voltage has not yet been reached, the controller 599 can continue to monitor the voltage of the capacitor bank. In one example, the capacitor bank 504 can be charged to $V_{power\ up}$, where $V_{power\ up}$ is a desired for powering up the inverter 505. As can be seen in FIG. 4, $V_{power\ up}$ is less than $V_{OC}$ but is greater than $V_{max}$. Operating at $V_{power\ up}$ will place less of a strain on the inverter 505 than if the inverter 505 were operating at $V_{OC}$. The inverter 505 would not need to be overdesigned to handle the higher voltage. Overdesigned systems have lower efficiency and higher complexity than systems that are not overdesigned.

Once the DC capacitor bank has reached the desired charge level, the DC voltage controller can initiate the operation of the inverter 505 (step 720). The inverter 505 begins to operate and draw current from the DC capacitor bank 504 to start generating AC power and the filter 506 begins synchronizing the AC output from the inverter 505 to the voltage and frequency of the grid 509.

The DC voltage controller then stabilizes the DC voltage of the system at power up voltage. $V_{power\ up}$ (step 725). The DC voltage controller can the close the DC switch 502 (step 730). Closing the DC switch allows DC power provided by the solar cell array 501 to charge the DC capacitor bank 504. The solar cell array 501 can now charging the DC capacitor bank as a current source with a constant current $I_{power\ up}$.

The DC voltage controller 599 can the wait for the inverter startup period to elapse (step 735) before adjusting the DC voltage from $V_{power\ up}$ to $V_{max}$ to allow the PV system 500 to generate as close to maximum power from the solar cell array 501 as possible (step 740).

The highly dynamic DC voltage controller keeps transient overshooting of DC voltage ($V_\Delta$), caused by the power generated by the solar cell array 501 after closing the DC switch 502, very low. As a result, the maximum DC voltage for the inverter operation is $V_{power\ up}+V_\Delta$. Additional equipment, such as a preload, can be eliminated even where the solar cell array 501 has a very high $V_{OC}$. Furthermore, because the operating voltages of the inverter 505 have been reduced, the inverter 505 can use higher efficiency components.

Those of skill will appreciate that the various illustrative logical blocks, modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

While the foregoing disclosure shows illustrative aspects and/or embodiments, it should be noted that various changes and modifications could be made herein without departing from the scope of the described aspects and/or embodiments as defined by the appended claims. For example, for enhanced security, it should be noted that data stored on wireless device and/or data stored on remote server may be stored in an encrypted format. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for initializing a power inverter of a photovoltaic system comprising a solar cell array, the method comprising:
   opening an alternating current (AC) mains switch and a direct current (DC) switch, wherein opening the AC mains switch disconnects the power inverter from an electrical grid, and wherein opening the DC switch disconnects a DC capacitor bank associated with the power inverter from the solar cell array to prevent power produced by the solar cell array from flowing into the DC capacitor bank;
   closing the AC mains switch to allow power to flow from the electrical grid to the DC capacitor bank connected to the power inverter to charge the DC capacitor bank to a power up voltage of the power inverter;
   initiating operation of the power inverter such that the power inverter begins to receive a DC voltage from the DC capacitor bank responsive to the DC capacitor bank being charged to the power up voltage;
   stabilizing the DC voltage received at the power inverter from the DC capacitor bank at the power up voltage of the power inverter, the power up voltage of the power inverter being greater than a maximum output power of the solar cell array and less than an open circuit voltage for the solar cell array before a load is connected to the solar cell array;
   closing the DC switch to allow power produced by the solar cell array to flow into and to charge the DC capacitor bank responsive to stabilizing the DC voltage at the power up voltage of the power inverter such that the solar cell array provides a constant power up current to the DC capacitor bank to limit transient overshooting of the power up voltage;
   waiting for an inverter initialization period to elapse; and
   adjusting the DC voltage received by the power inverter to a voltage associated with a maximum power output level of the solar cell array.

2. The method of claim 1 wherein the DC capacitor bank stores an electrical charge and outputs a DC current to the power inverter.

3. The method of claim 1 wherein stabilizing the DC voltage received from the DC capacitor bank at the power up voltage for the power inverter further comprises stabilizing the DC voltage received at the DC capacitor bank at the power up voltage for the power inverter.

4. The method of claim 3 wherein the voltage associated with the maximum power output level of the solar cell array is less than the power up voltage for the power inverter.

5. The method of claim 1, further comprising:
   after stabilizing the DC voltage received from the DC capacitor bank at the power up voltage for the power inverter, closing the DC switch to allow the solar cell array to provide DC power to the DC capacitor bank to charge the DC capacitor bank.

6. The method of claim 1 wherein the power inverter, upon initiating operation, converts the DC voltage received from the DC capacitor bank to AC voltage that can be output onto the electrical grid.

7. The method of claim 1, further comprising:
outputting AC voltage to the electrical grid.

8. A controller for a photovoltaic system, the photovoltaic system comprising a solar cell array, a direct current (DC) capacitor bank, an alternating current (AC) switch, and a DC switch, the controller comprising:
a tangible, non-transitory computer-readable memory;
a plurality of modules comprising processor executable code stored in the memory;
a processor connected to the memory and configured to access the plurality of modules stored in the memory; and
a control interface configured to send control signals to the AC switch, the DC switch, and a power inverter of the photovoltaic system;
wherein the plurality of modules stored in the memory includes:
a voltage control module configured to cause the processor to perform a method for initializing a power inverter of a photovoltaic system comprising:
opening an alternating current (AC) mains switch and a direct current (DC) switch, wherein opening the AC mains switch disconnects the power inverter from an electrical grid, and wherein opening the DC switch disconnects the power inverter from the solar cell array to prevent power produced by the solar cell array from flowing into the DC capacitor bank,
closing the AC mains switch to allow power to flow from the electrical grid to a DC capacitor bank connected to the power inverter to charge the DC capacitor bank to a power up voltage of the power inverter,
initiating the operation of the power inverter such that the power inverter begins to receive a DC voltage from the DC capacitor bank responsive to the DC capacitor bank being charged to the power up voltage,
stabilizing the DC voltage received at the power inverter from the DC capacitor bank at the power up voltage of the power inverter, the power up voltage of the power inverter being greater than a maximum output power of the solar cell array and less than an open circuit voltage for the solar cell array before a load is connected to the solar cell array,
closing the DC switch to allow power produced by the solar cell array to flow into and to charge the DC capacitor bank responsive to stabilizing the DC voltage at the power up voltage of the power inverter such that the solar cell array provides a constant power up current to the DC capacitor bank to limit transient overshooting of the power up voltage,
waiting for an inverter initialization period to elapse, and
adjusting the DC voltage received by power inverter to a maximum voltage associated with a maximum power level of the solar cell array;
a control signal module configured to cause the processor to send control signals to the AC switch, the DC switch, and the power inverter.

9. The controller of claim 8 wherein the DC capacitor bank stores an electrical charge and outputs a DC current to the power inverter.

10. The controller of claim 8 wherein stabilizing the DC voltage received from the DC capacitor bank at the power up voltage for the power inverter further comprises stabilizing the DC voltage received at the DC capacitor bank at the power up voltage for the power inverter.

11. The controller of claim 10 wherein the voltage associated with the maximum power output level of the solar cell array is less than the power up voltage for the power inverter.

12. The controller of claim 8, further comprising:
after stabilizing the DC voltage received from the DC capacitor bank at the power up voltage for the power inverter, closing the DC switch to allow the solar cell array to provide DC power to the DC capacitor bank to charge the DC capacitor bank.

13. The controller of claim 8 wherein the power inverter, upon initiating operation, converts the DC voltage received from the DC capacitor bank to AC voltage that can be output onto the electrical grid.

14. A system for initializing a power inverter of a photovoltaic system comprising a solar cell array, comprising:
means for opening an alternating current (AC) mains switch and a direct current (DC) switch, wherein opening the AC mains switch disconnects the power inverter from an electrical grid, and wherein opening the DC switch disconnects a DC capacitor bank associated with the power inverter from the solar cell array to prevent power produced by the solar cell array from flowing into the DC capacitor bank;
means for closing the AC mains switch to allow power to flow from the electrical grid to the DC capacitor bank connected to the power inverter to charge the DC capacitor bank to a power up voltage for the power inverter;
means for initiating the operation of the power inverter such that the power inverter begins to receive a DC voltage from the DC capacitor bank responsive to the DC capacitor bank being charged to the power up voltage;
means for stabilizing the DC voltage received at the power inverter from the DC capacitor bank at the power up voltage for the power inverter, the power up voltage of the power inverter being greater than a maximum output power of the solar cell array and less than an open circuit voltage for the solar cell array before a load is connected to the solar cell array;
means for closing the DC switch to allow power produced by the solar cell array to flow into and to charge the DC capacitor bank responsive to stabilizing the DC voltage at the power up voltage of the power inverter such that the solar cell array provides a constant power up current to the DC capacitor bank to limit transient overshooting of the power up voltage;
means for waiting for inverter initialization period to elapse; and
means for adjusting the DC voltage received by the power inverter to a voltage associated with a maximum power output level of the solar cell array.

15. The system of claim 14 wherein the DC capacitor bank stores an electrical charge and outputs a DC current to the power inverter.

16. The system of claim 14 wherein the means for stabilizing the DC voltage received from the DC capacitor bank at the power up voltage for the power inverter further comprises means for stabilizing the DC voltage received at the DC capacitor bank at the power up voltage for the power inverter.

17. The system of claim 16 wherein the voltage associated with the maximum power output level of the solar cell array is less than the power up voltage for the power inverter.

18. The system of claim 14, further comprising:
means for closing the DC switch to allow the solar cell array to provide DC power to the DC capacitor bank to charge the DC capacitor bank when the DC voltage received from the DC capacitor bank at the power up voltage for the power inverter has been stabilized.

19. The system of claim 14 wherein the power inverter, upon initiating operation, includes means for converting the DC voltage received from the DC capacitor bank to AC voltage that can be output onto the electrical grid.

\* \* \* \* \*